Aug. 26, 1952   H. GRUBER   2,607,918
ANTIGLARE EYESHIELD FOR AUTOMOBILE DRIVERS
Filed April 12, 1950
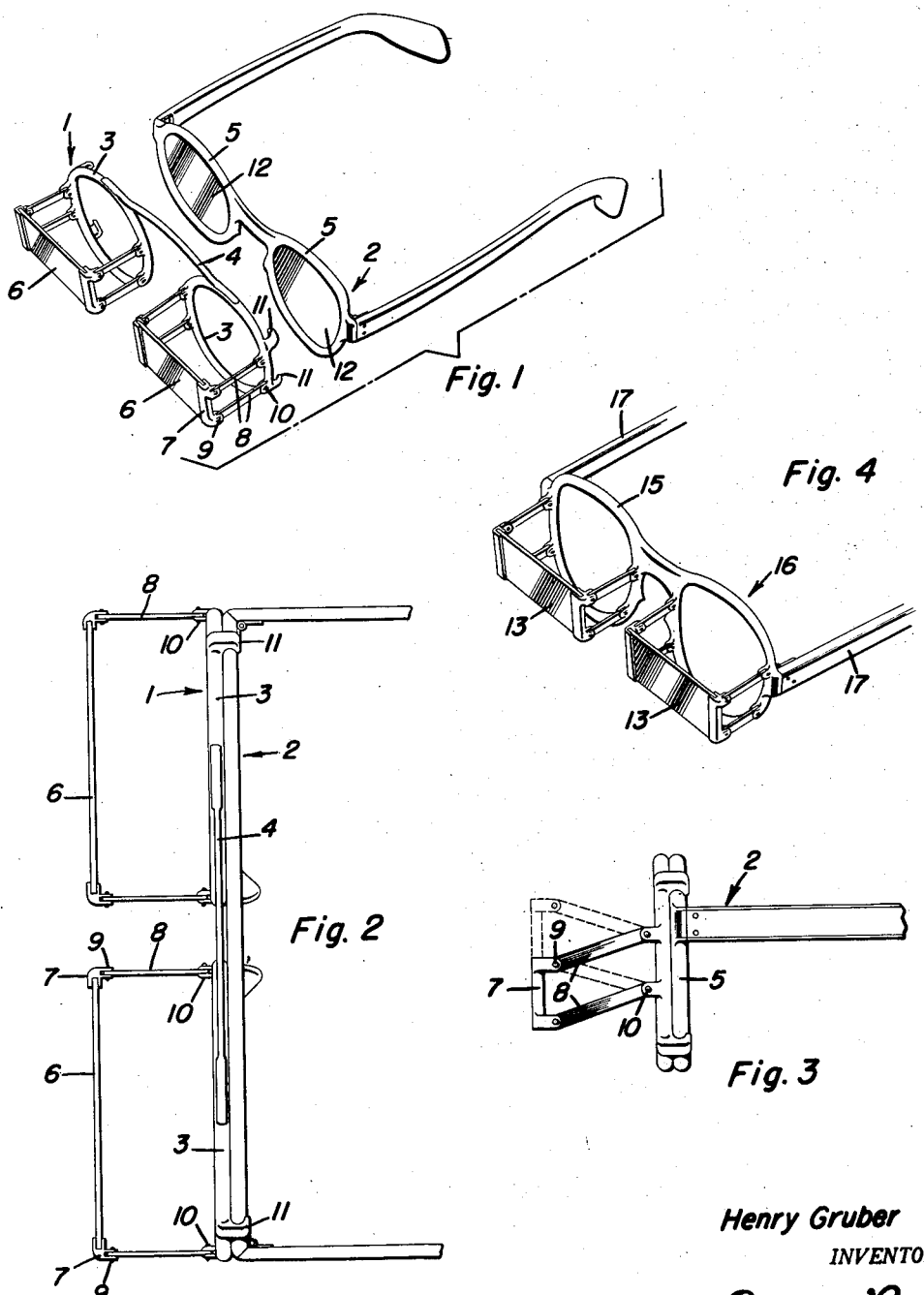
Henry Gruber
INVENTOR.

Patented Aug. 26, 1952

2,607,918

UNITED STATES PATENT OFFICE 2,607,918

ANTIGLARE EYESHIELD FOR AUTOMOBILE DRIVERS

Henry Gruber, St. Louis, Mo.

Application April 12, 1950, Serial No. 155,439

2 Claims. (Cl. 2—13)

My invention relates to improvements in antiglare shields for the eyes of automobile drivers.

The primary object of my invention is to provide, for automobile drivers, a simple form of eye shield for reducing the confusing and often blinding glare of automobile headlights, and the glare of the sun in the daytime.

Another object is to provide an eye shield for the above purposes which will not interfere with normal eye sight vision while driving.

Still another object is to provide an eye shield for the above purposes which will not interfere with the normal use of eye glasses, or spectacles.

Another object is to provide an eye shield for accomplishing the above which is simple in construction, and inexpensive to manufacture and use.

Other and subordinate objects, within the purview of my invention, together with the precise nature of my improvements, will be readily understood when the succeeding description and claims are read with reference to the drawing accompanying and forming part of the specification.

In said drawing:

Figure 1 is a view in perspective of my improved anti-glare eye shield in the preferred embodiment thereof illustrating the relation of the same to the spectacles, but, detached therefrom;

Figure 2 is a view in plan drawn to a larger scale and illustrating the anti-glare eye shield attached to the pair of spectacles;

Figure 3 is a view in side elevation; and

Figure 4 is a view in perspective of a modified embodiment of the invention.

Referring now to the drawing by numerals, and first to Figures 1 to 3, my improved anti-glare eye shield, in the preferred embodiment thereof, comprises an attaching frame 1 for mounting on conventional spectacles 2, or the like, said frame including a pair of oval eye frames 3 connected by a nose bridge 4 and being of the proper size and spaced apart to fit in front of the eye glass frames 5 of the spectacles 2.

A pair of oblong, preferably rectangular, glare-reducing, flat panes 6, of transparent plastic, or glass, suitably colored to reduce glare, are mounted, as presently described, in front of and opposite the eye frames 3 at a suitable distance therefrom to extend endwise longitudinally of said frames 3 in planes parallel with the plane of said frames. The glare-reducing panes 6 are of substantially the same length as the eye frames 3, but are of less width than said frames 3 for a purpose presently clear.

Each glare-reducing pane 6 is mounted on one of the eye frames 3 by a pair of end channel bars 7 in which the pane 6 is suitably fixed, and pairs of upper and lower links 8 pivoted at the ends of said bars at the corners of said panes, as at 9, and to the ends of the opposite eye frame 3, as at 10, with the links 8 in parallel relation. The pivots 9, 10 extend longitudinally of the eye frames 3 so that said panes 6 are swingably adjustable on said frames 3 in planes parallel with the plane of said frames and vertically thereof, and the pivots 10 of the upper and lower links 8 are arranged on the eye frames 3 above and below the longitudinal axes of said frames 3. All of the pivots 9, 10 are friction locking so as to retain the glare-reducing panes 6 in adjusted position.

Suitable snap action clips 11 are provided on the eye frames 3 so that the attaching frame 1 may be mounted on the eye glass frames 5 of the spectacles 2 in front thereof with the glare-reducing panes 3 spaced apart in correspondence with said frames 5.

In using the described invention, in night driving, the glare-reducing panes 6 are adjusted slightly below the axes of the lenses 12 of the spectacles 2 so that a driver may have clear vision over the top of said panes. When said panes 6 are thus adjusted, the driver, by tilting his head upwardly, slightly, may bring said panes into the line of vision to shield the eyes from the glare of headlights, or from glare on the road. In daytime driving, the glare-reducing panes 6 are preferably adjusted slightly above the axes of the lenses 12 clear of the line of vision to reduce the glare of sunlight shining in the eyes while providing for clear vision of the road.

In the modified embodiment of the invention illustrated in Figure 4, the glare-reducing panes, designated 13, are directly mounted, in the same manner as previously described, on a pair of open, or lenseless, eye glass frames 15 of spectacles 16 for holding in position by the usual bows 17 of the spectacles. The use and operation, in this modified embodiment, are the same as described with reference to the preferred embodiment.

The foregoing will, it is believed, suffice to impart a clear understanding of my invention without further explanation.

Manifestly, the invention, as described, is susceptible of modification without departing from the inventive concept, and right is herein reserved to modifications falling within the scope of the appended claims.

Having described the invention, what is claimed as new is:

1. An anti-glare shield for automobile drivers comprising a pair of coplanar frames connected together for positioning in front of the eyes of the driver, a pair of rectangular panes of transparent glare reducing material, and means attaching said panes to said frames for vertical adjustment in front thereof while maintaining said panes in planes parallel to the plane of said frames comprising pairs of parallel links pivoted at corresponding ends thereof to opposite sides of said frames with the other ends thereof pivoted to the corners of said panes.

2. An anti-glare eye shield for automobile drivers comprising a pair of panes of transparent glare-reducing material, and means for attaching said panes to the head of the driver in front of the eyes and for vertical independent adjustment relative to the eyes, said means maintaining said panes in parallel planes with respect to each other, said means comprising an eyeglass frame, and pairs of parallel vertically spaced links pivotally connected at the ends thereof to said panes and to said frame for vertical adjustment of said panes in planes parallel to the plane of said frame.

HENRY GRUBER.

REFERENCES CITED

The following references are of record in the file of this patent:

UNITED STATES PATENTS

| Number | Name | Date |
|---|---|---|
| 1,899,903 | Simon et al. | Feb. 28, 1933 |

FOREIGN PATENTS

| Number | Country | Date |
|---|---|---|
| 43,141 | France | Dec. 6, 1933 |
| 545,723 | Germany | Mar. 4, 1932 |
| 578,526 | France | July 5, 1924 |